United States Patent [19]

Doerr et al.

[11] Patent Number: 5,576,881
[45] Date of Patent: Nov. 19, 1996

[54] MULTI-FREQUENCY OPTICAL SIGNAL SOURCE HAVING REDUCED DISTORTION AND CROSSTALK

[75] Inventors: Christopher R. Doerr, Atlantic Highlands; Charles H. Joyner; Martin Zirngibl, both of Middletown, all of N.J.

[73] Assignee: Lucent Technologies Inc., Murray Hill, N.J.

[21] Appl. No.: 521,100

[22] Filed: Aug. 29, 1995

[51] Int. Cl.[6] .................. H01S 3/00; H04J 14/08
[52] U.S. Cl. .................. 359/333; 359/133; 359/180
[58] Field of Search .................. 359/132, 133, 359/134, 180, 333, 337

[56] References Cited

U.S. PATENT DOCUMENTS

| | | | |
|---|---|---|---|
| 5,017,885 | 9/1990 | Saleh | 330/4.3 |
| 5,136,671 | 8/1991 | Dragone | 385/46 |
| 5,305,134 | 4/1994 | Tsushima et al. | 359/192 |
| 5,396,360 | 3/1995 | Majima | 359/133 |
| 5,504,609 | 4/1996 | Alexander et al. | 359/125 |

Primary Examiner—Mark Hellner

[57] ABSTRACT

A multi-frequency optical signal source is adapted to include a plurality of power splitters, each connected to obtain a portion of an electrical data signal used to modulate a different one of the plurality of input optical sources; a plurality of delay means, each connected to an output of a different power splitter, each delay means providing a different predetermined signal delay; and an electrical signal combiner having a plurality of inputs, each input connected to a different output of the respective delay means, for electrically combining a portion of the modulation signal received from the connected delay means to form a combined electrical signal at an output of the electrical signal combiner, the output of the combiner being connected to control biasing of the optical output amplifier. The resulting multi-frequency optical signal source exhibits reduced signal distortion and crosstalk by keeping the carrier density constant in its shared optical output amplifier.

14 Claims, 6 Drawing Sheets

MULTI-FREQUENCY OPTICAL SIGNAL SOURCE HAVING REDUCED DISTORTION AND CROSSTALK

FIELD OF THE INVENTION

This invention relates to a multi-frequency optical signal source and, more particularly, to reducing distortion and crosstalk therein.

BACKGROUND OF THE INVENTION

Optical sources that can produce several intensity-modulated signals at different frequencies simultaneously are becoming increasingly important for wavelength-division-multiplexed optical communications. Such sources usually consist of several lasers operating at different optical frequencies that are either multiplexed extra-cavity (e.g., FIG. 1a) or intra-cavity (e.g., FIG. 1b). The components for such multi-frequency sources are often integrated in a photonic circuit, and there is often an optical output amplifier (e.g., 101) through which all the signals pass. This optical amplifier is necessary to boost the power of the optical signals. However, the amplification of the optical signals causes carrier density changes in the optical amplifier. The carrier density changes in turn affect the optical amplifier gain, resulting in nonlinear operation which produces signal distortion and crosstalk between the signals.

SUMMARY OF THE INVENTION

We present a scheme for reducing nonlinearities such as signal distortion and crosstalk in a multi-frequency optical signal source. Illustratively, a multi-frequency optical signal source includes a shared optical output amplifier, an optical combiner (or router) having a plurality of inputs and an output connected to the output amplifier, and a plurality of input optical sources, each connected to a respective one of the plurality of inputs of the optical combiner. In accordance with the present invention, the multi-frequency optical signal source further includes a plurality of power splitters, each connected to obtain a portion of an electrical data signal used to modulate a different one of the plurality of input optical sources; a plurality of delay means, each connected to an output of a different power splitter, each delay means providing a different predetermined signal delay; and an electrical signal combiner having a plurality of inputs, each input connected to a different output of the respective delay means, for electrically combining a portion of the modulation signal received from the connected delay means to form a combined electrical signal at an output of the electrical signal combiner, the output of the combiner being connected to control biasing of the optical output amplifier.

DETAILED DESCRIPTION

Figure 1A:
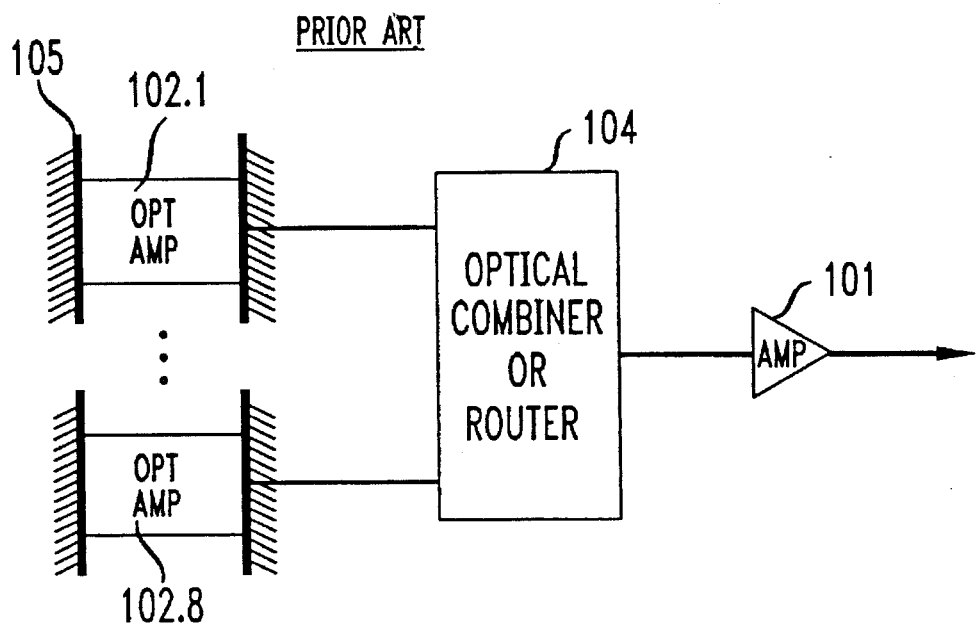
FIG. 1a shows a prior art multiplex cavity type multi-frequency optical signal source.
Figure 1B:
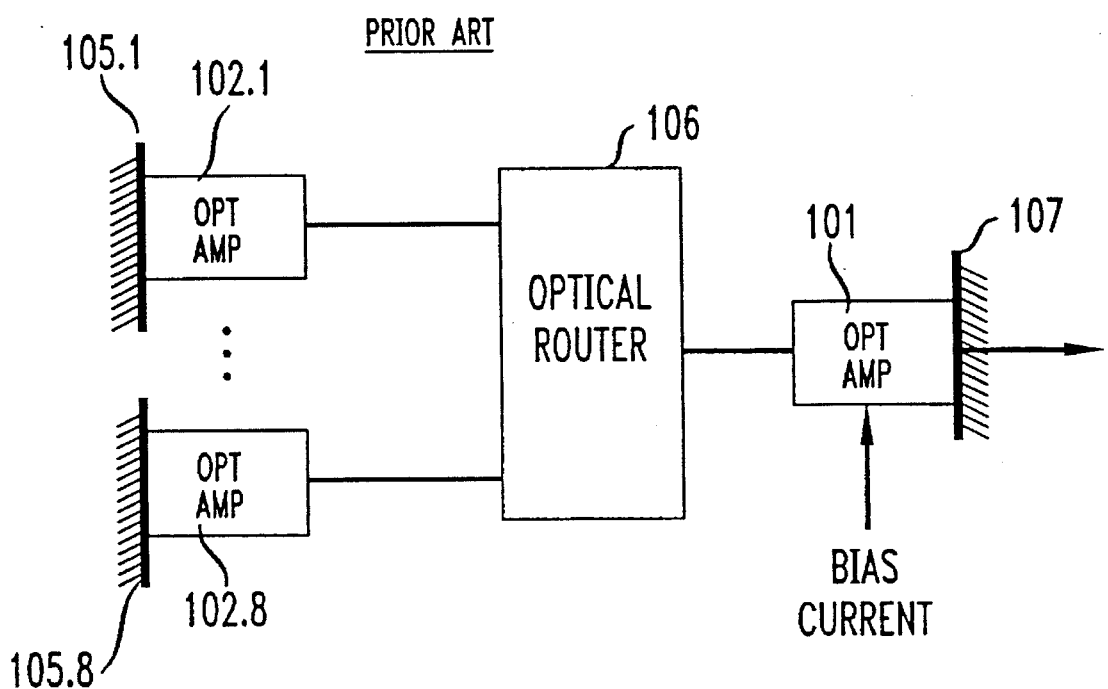
FIG. 1b shows a prior art intra-cavity multiplexed multi-frequency optical signal source.

With reference to prior art FIG. 1a, individual laser sources, at different wavelengths, are formed using amplifiers 102.1–102.8 (although the number could be more or less than eight) having a mirror reflector 103 at each end to form the laser cavity. Multiplexing of the resulting laser signals occurs, outside the cavities, in optical combiner or router 104. In FIG. 1b, each laser signal is generated and multiplexed within the laser cavity. Each individual laser has a different cavity which extends from one of the mirror reflectors (e.g., 105.1) through router 106 and optical amplifier 101 to mirror reflector 107. With continued reference to FIG. 1b, we discuss how to reduce signal distortion and crosstalk in the optical amplifier 101.

The well-known equation for the carrier density N in an optical amplifier is $$\frac{dN(t)}{dt} = \frac{I(t)}{ev} - \frac{N(t)}{\tau_n} - \frac{[N(t) - N_t]P(t)}{\tau_n P_{sat}} \quad (1)$$

where t is time, I is the injected current, e is the charge of an electron, v is the active area volume, $1/\tau_n$ is the spontaneous recombination rate, $N_t$ is the transparency carrier density, P is the optical power, and $P_{sat}$ is the saturation power. We ignore the gain compression coefficient, commonly called $\epsilon$, in this simple analysis.

One can see from Equation 1 that the carrier density N changes with changes in optical power P. A change in N causes three main effects: change in the overall amplifier gain, change in the index of refraction of the amplifier (real part) which shifts the Fabry-Perot resonances of the amplifier (caused by reflections at the amplifier interfaces), and movement of the material gain spectrum. These gain changes result in signal distortion and inter-channel crosstalk.

To eliminate signal distortion and crosstalk, we wish to keep N(t) constant, regardless of P(t). One can accomplish this by driving the current I(t) with a constant bias plus a signal proportional to P(t). One can show that if $$I(t) = I_0 + \frac{\tau_n I_0 - N_t ev}{\tau_n P_{sat}} \quad (2)$$

then the solution to Equation 1 is $N(t) = I_0 \tau_n/(ev)$, which is a constant.

Figure 2:
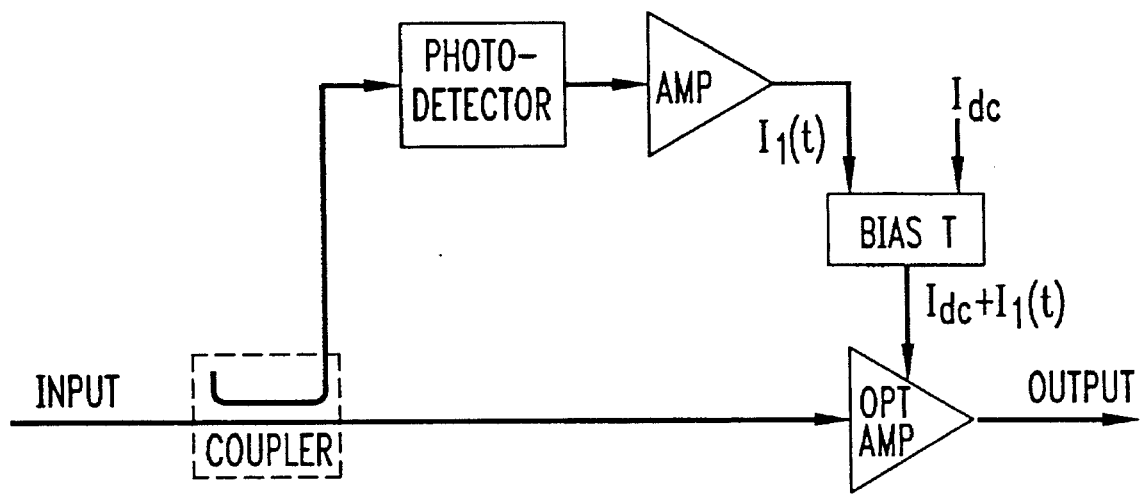
FIG. 2 shows a prior art optical amplifier having reduced nonlinearity.

Such a scheme is described in U.S. Pat. No. 5,017,885, entitled "Optical Amplifier With Reduced Nonlinearity," issued on May 21, 1991 to A. A. M. Saleh. FIG. 2 shows an embodiment of the Saleh patent where some of the incident optical power is coupled to a photodetector, and the photodetector current with the appropriate delay and magnitude is used to adjust the bias to a shared optical amplifier.

The Saleh patent requires that the optically-detected signal be proportional to the incoming optical signal. This is best done, as is shown in FIG. 2, by using a coupler to split off some of the light to the photodetector. However, this coupler is not straightforward to implement in many of the multi-frequency signal source arrangements, such as the waveguide grating router laser (the multi-frequency laser—MFL 300 shown in FIG. 3), because there is no room to put the coupler and photodetector.

Figure 3:
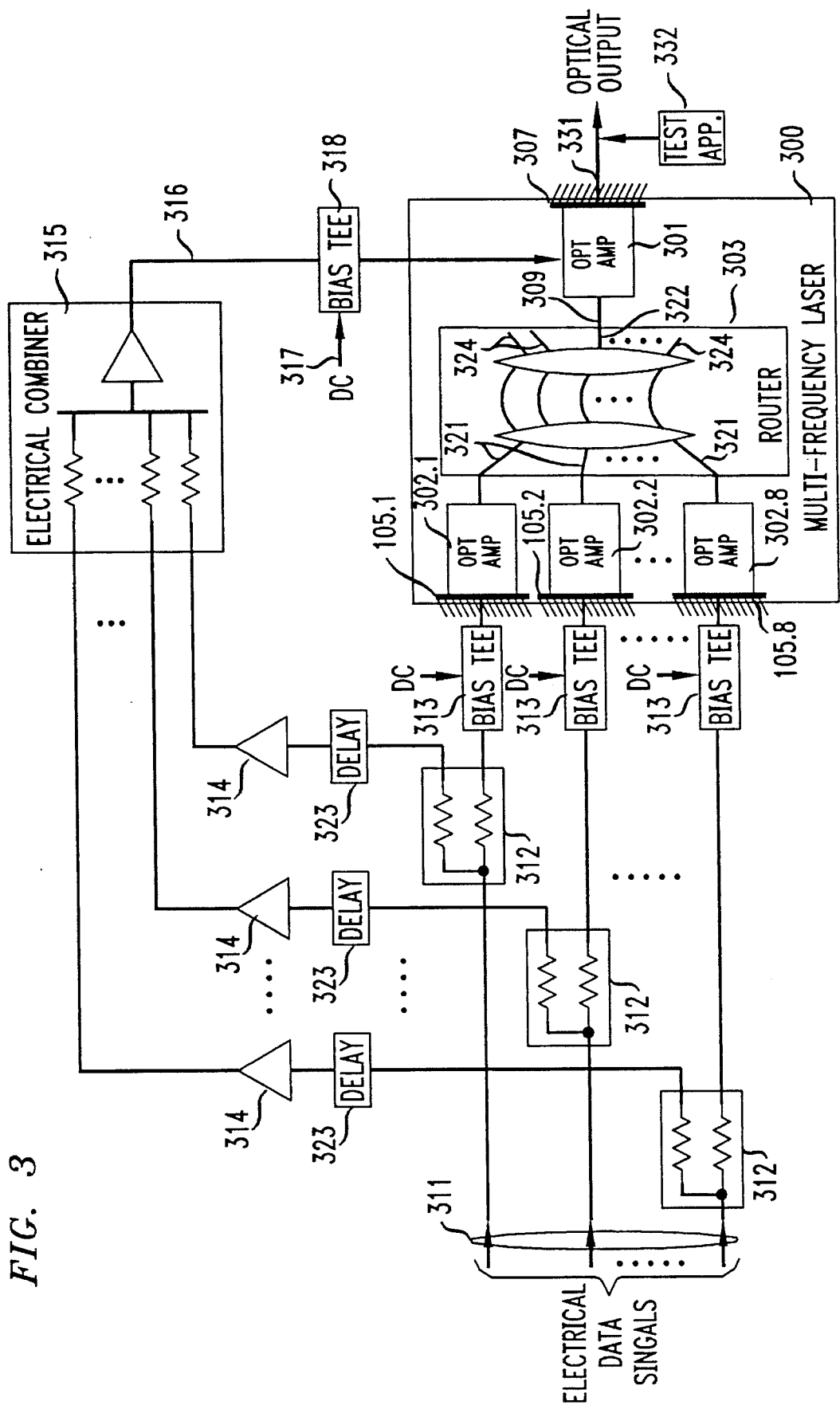
FIG. 3 shows a multi-frequency optical signal source in accordance with the present invention.

With reference to FIG. 3, the present invention recognizes that the Saleh bias adjustment technique can be adapted for use with a multi-frequency laser 300. The present approach uses a novel way to obtain bias adjust signal 316 proportional to the multi-frequency laser optical power 309 incident on the input of shared optical amplifier 301 of MFL 300.

It is known that with a multi-frequency source, the optical power passing through the shared amplifier is approximately proportional to an appropriately delayed and weighted sum of the electrical signals driving the channels, provided that the channel spacing is >22 1/τ+hd n (~0.3 GHz). We have determined that by appropriately generating a bias adjust signal 316 proportional to such a sum of the electrical channel drive signals 311 and adding it to the DC current drive 317 of the shared optical amplifier 301, the carrier density in the shared amplifier 301 can be held constant. However, since the proposed scheme uses a bias adjust signal 316 which is the sum of the electrical drive signals 311 to drive the shared optical amplifier 301, that bias adjust signal needs to be made proportional to the combined laser signals appearing on waveguide 309.

With continued reference FIG. 3, we describe an illustrative eight-channel multi-frequency laser (MFL) source (eight laser sources in this example) in accordance with our invention. The MFL 300 is the previously described multiplexed intra-cavity type (similar to FIG. 1b) and includes semiconductor optical amplifiers 302.1–302.8, waveguide grating router 303, and semiconductor optical amplifier 301 and reflector 307. Each of the reflectors 305.1–305.8, together with their respective path 321 through router 303, optical amplifier 301 and reflector 307, form the cavity for each laser source.

The router may be implemented using the optical interconnection apparatus, FIG. 1 of U.S. Pat. No. 5,136,671, entitled "Optical Switch, Multiplexer and Demultiplexer," issued on Aug. 4, 1992 to C. Dragone, and incorporated by reference herein, or using other well-known wavelength routers. Each of the electronic data signals 311 are used to modulate a different laser via a bias tee 313. Power splitters 312 are used to obtain a portion on the input data signals 311 which are, respectively, delayed by delay 323, amplified by amplifiers 314 and then summed or combined by power combiner 315. Each optical channel has its own waveguide input link 321. At the coupler 320 output, there are many optical waveguides 324 closely spaced. Although only one 322 of the waveguides 324 is used, the others may be used for testing and to improve MFL 300 chip performance by giving a choice of output waveguides to use.

The delays 323 provide electrical signal delay to ensure that the electrical signals of a channel of the MFL 300 reach the shared semiconductor amplifier 301 at the same time as its associated optical channel signal. In one embodiment, the delays 323 are provided by varying the electrical connection path lengths for each channel. The electrical path lengths (i.e., from power splitter 312 to bias tee 318) are determined to provide a delay so that a signal driving a channel of the MFL 300 reaches the shared semiconductor amplifier 301 through the optical and electrical paths simultaneously.

Figure 4:
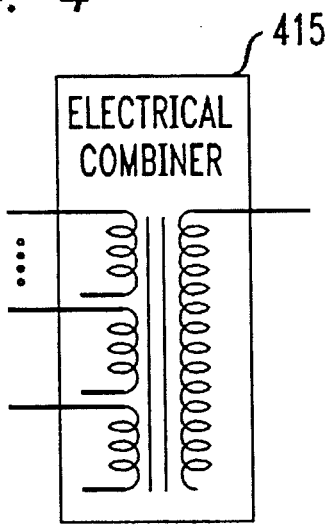
FIG. 4 shows an illustrative transformer coupled combiner for use in the present invention.

While combiner 315 is shown as a resistive combiner, optionally including an amplifier 314, combiner 315 can also utilize transformer coupling as shown by 415 of FIG. 4. Additionally, while power splitters 312 are shown as resistive splitters, they may also be implemented using transformer coupling (similar to the combiner shown by 415 of FIG. 4). The amplifier 314 or resistor of combiner 315 can be adjusted to provide the appropriate signal level from each of the data signals 311 to provide the desired distortion and crosstalk level in the optical output signal 320 from amplifier 301. The combined output signal 316 from combiner 315 together with DC bias 317 are combined in bias tee 318 to bias amplifier 301.

With joint reference to FIGS. 3 and 5, we describe an illustrative arrangement and performance of an eight-channel MFL 300 having 200 GHz spacing between channels.

Illustratively, the MFL 300 consists of a waveguide grating router (WGR) 303 formed in Indium Phosphide (InP) with an array of multiple quantum well (MQW) semiconductor amplifiers 302.1–302.2 on one side and one shared MQW semiconductor amplifier 301 on the other. With shared amplifier 301 bias current of 95 mA, the typical lasing threshold current of each channel alone was 30 mA. Each channel could be directly modulated at speeds over 1 Gb/s with non-return-to-zero (NRZ) signals. Reflection at the shared amplifier-to-passive waveguide interface 307 was extremely small, and a peak-to-peak ripple of only 0.7 dB in the spontaneous emission spectrum of the shared amplifier at 150 mA bias current when the other amplifiers were off was observed. For a test arrangement, the amplifier 301 output was coupled through a lensed fiber 331 to a test apparatus 332 including (but not shown) an isolator, a tunable 1-nm filter to select the desired channel, and then to an avalanche photodiode receiver optimized for 2.5 Gb/s signals.

Figure 5A:
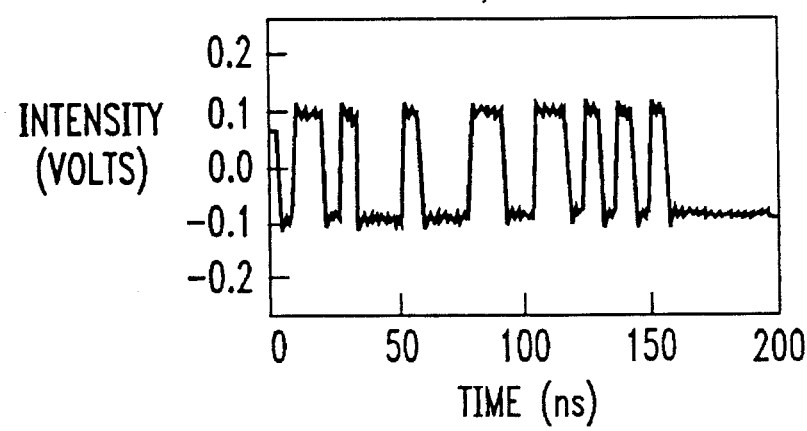
FIGS. 5a–5f shows resulting crosstalk signals of a multi-frequency optical signal source with and without the utilization of the techniques of the present invention.
Figure 5C:
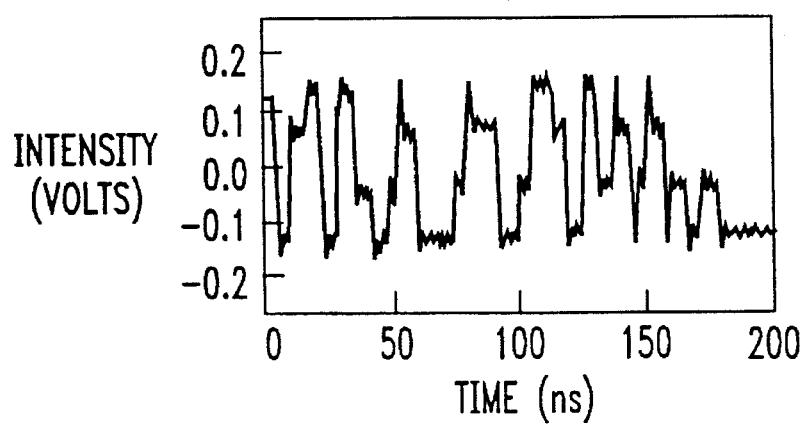
Figure 5E:
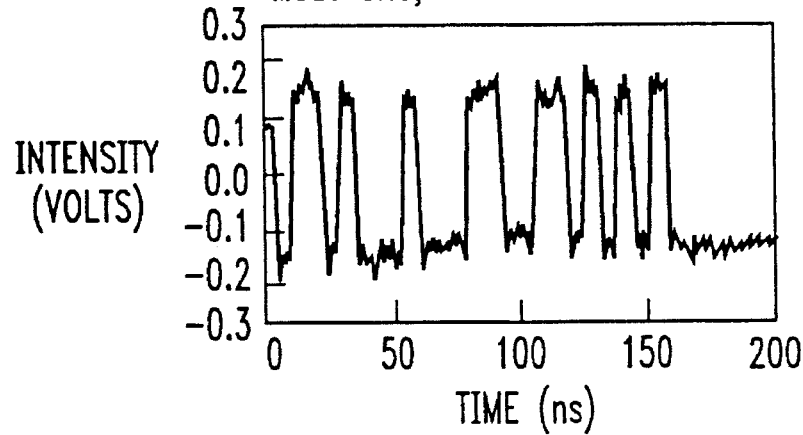
Figure 5B:
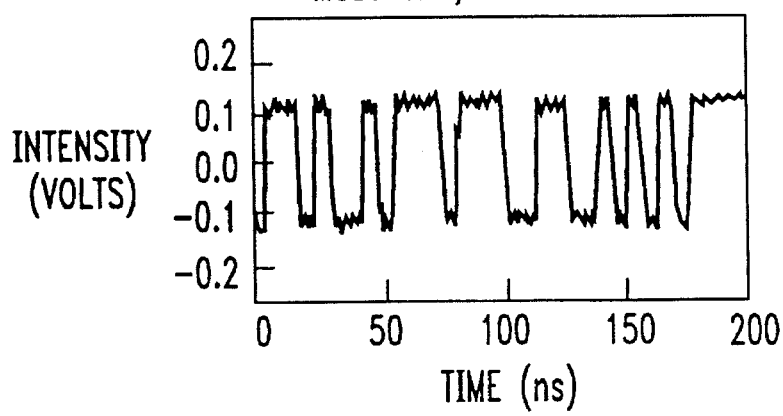
Figure 5D:
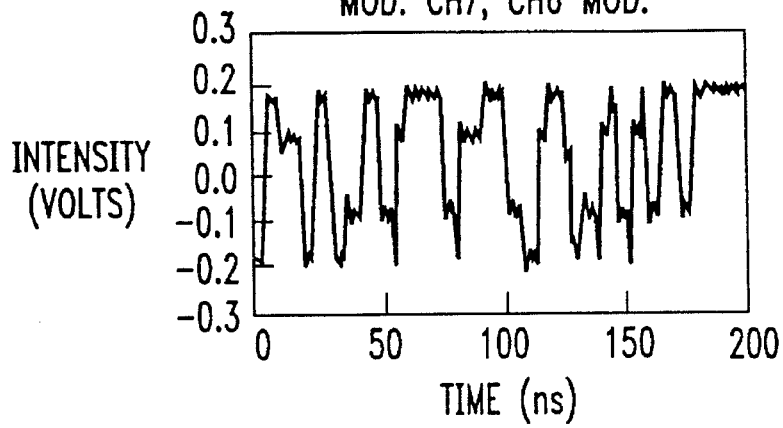

FIGS. 5a–5d demonstrate the crosstalk when two channels (channels 6 and 7) of the MFL of FIG. 3 were directly modulated with NRZ RF signals at 155 Mb/s. FIG. 5a shows channel 6 when the laser for channel 6 was modulated and the laser for channel 7 was lasing but unmodulated. FIG. 5b shows channel 7 when the laser for channel 7 was modulated and the laser for channel 6 was lasing but unmodulated. FIGS. 5c and 5d show channels 6 and 7, respectively, when both channels were modulated simultaneously. One can see the signal degradation due to crosstalk. The amount of crosstalk was approximately independent of the bias current of the common amplifier, throughout the range 75 to 170 mA.

Figure 5F:
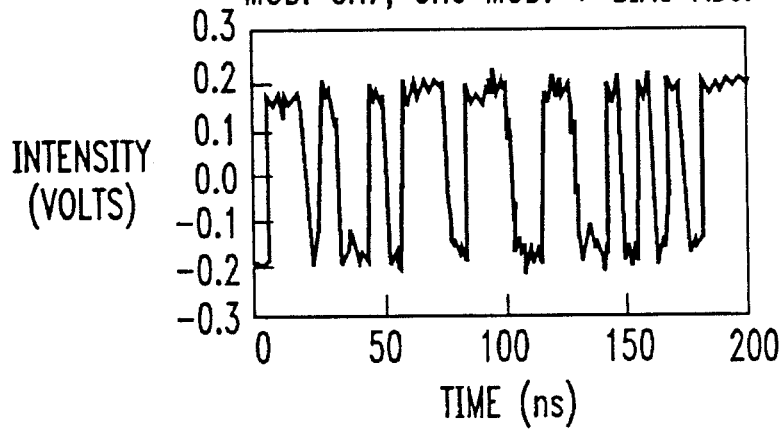

FIGS. 5e and 5f show channels 6 and 7, respectively, when both channels were modulated simultaneously and the carrier density control technique of FIG. 3 was employed. One can see that keeping the carrier density constant not only eliminates the inter-channel crosstalk but also increases the intensity differential between the 0's and 1's. Most of the imperfections were probably due to electrical delay and impedance mismatches. For effective crosstalk elimination, it was found that the electronic cables (between splitter 312 and combiner 315) had to be within ~± 2 cm of their proper lengths, and the RF data signal powers had to be within ~± 1 dB of their optimum values.

The present invention demonstrates that carrier density in a shared semiconductor optical amplifier 301 of a multi-frequency laser (MFL) 300 can be kept constant by adding to the bias current of the optical amplifier 301 an electrical signal 316 proportional to the incident optical power 309 into the optical amplifier 301. A good approximation to the incident optical power for MFL 300 is the sum of the electrical channel modulation drive signals. Keeping a constant carrier density eliminates the signal distortion and crosstalk in the shared amplifier 301.

Figure 6:
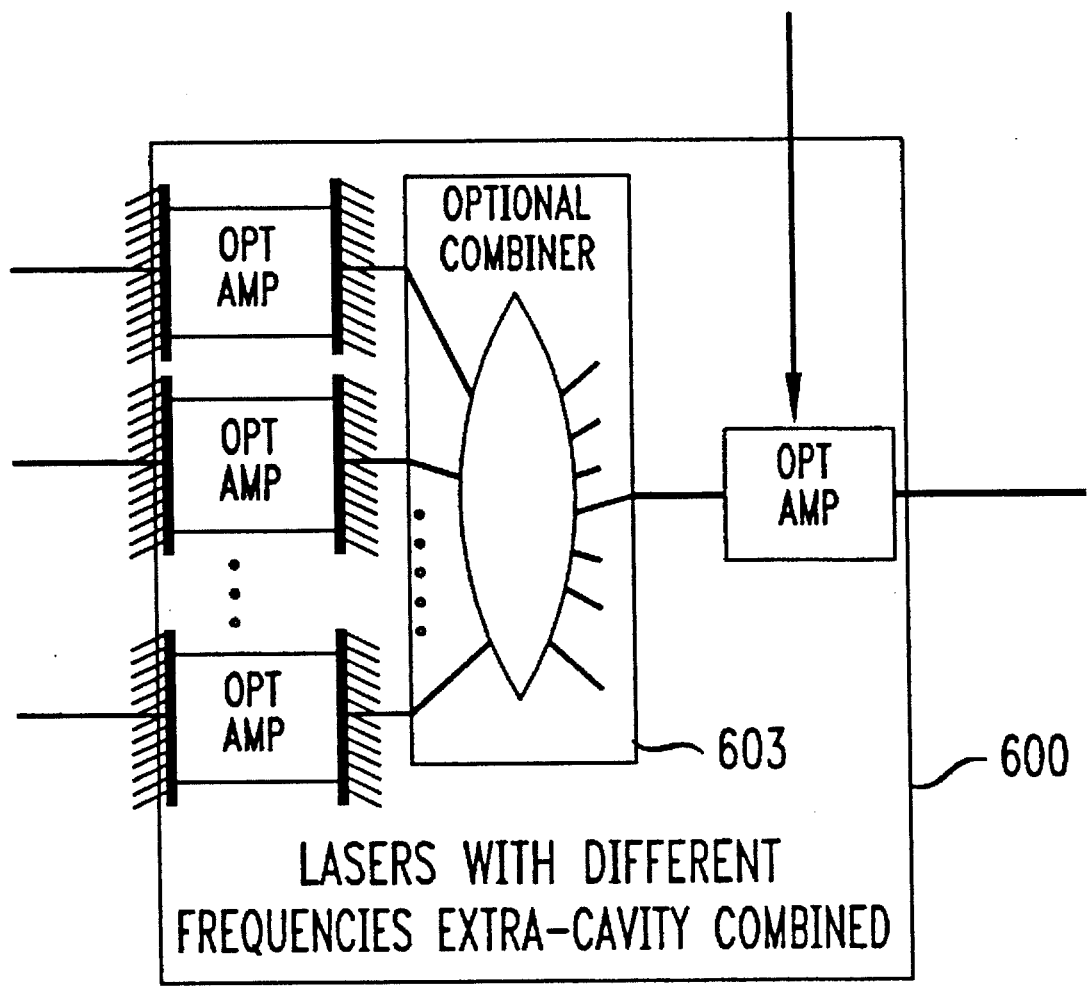
FIG. 6 shows an alternative embodiment.

The above technique can also be used with analog input signals (at 311) and be applicable to extra-cavity combined multi-frequency lasers (of the type shown in FIG. 1a) as well. An example of this configuration is shown in more detail in FIG. 6. In this case the combined optical sources 600 would be substituted for the MFL in FIG. 3. The optical combiner 603 of FIG. 6 can also instead be a router, such as 303. The circuitry of FIG. 3, when arranged as a multiplexed extra-cavity type (FIG. 1a), can be implemented as one or more integrated circuit chips. When arranged as an intra-cavity type (FIG. 1b), the circuitry of FIG. 3 is best implemented on a single chip. It should also be noted that the electrical signal combiner 315 and/or delay circuits 323 may be implemented using a digital circuit, such as a digital processor.

What has been described is merely illustrative of the application of the principles of the present invention. Other arrangements and methods can be implemented by those skilled in the art without departing from the spirit and scope of the present invention.

We claim:

1. A multi-frequency optical signal source comprising an optical output amplifier, an optical combiner having a plurality of inputs and an output connected to the optical output amplifier, and a plurality of input optical sources, each connected to a respective one of the plurality of inputs of the optical combiner, the multi-frequency optical signal source further comprising a plurality of power splitters, each connected to obtain a portion of an electrical data signal used to modulate a different one of the plurality of input optical sources, a plurality of delay means, each connected to an output of a different power splitter, each delay means providing a different predetermined signal delay, and electrical signal combiner having a plurality of inputs, each input connected to a different output of the respective delay means, for combining a portion of the modulation signal received from the connected delay means to form a combined electrical signal at an output of the combining means, the output of the electrical signal combiner providing a biasing signal to optical output amplifier.

2. The multi-frequency optical signal source of claim 1 wherein the input optical sources are lasers.

3. The multi-frequency optical signal source of claim 1 wherein the input optical sources are lasers formed using the optical combiner and the optical output which are located within each laser's cavity.

4. The multi-frequency optical signal source of claim 1 wherein the electrical signal combiner is a summing circuit.

5. The multi-frequency optical signal source of claim 1 wherein the delay means is provided using electrical paths of different lengths.

6. The multi-frequency optical signal source of claim 1 wherein at least one power splitter includes an electrical amplifier.

7. The multi-frequency optical signal source of claim 1 wherein the electrical signal combiner and/or delay means are implemented using a digital circuit, such as a digital processor.

8. The multi-frequency optical signal source of claim 1 wherein the optical output amplifier receives a biasing signal at a DC bias circuit thereof.

9. The multi-frequency optical signal source of claim 1 wherein the electrical signal combiner includes an amplifier to sum the inputs.

10. The multi-frequency optical signal source of claim 1 wherein the power splitter is a resistor network.

11. The multi-frequency optical signal source of claim 1 wherein one or more amplifiers are each connected to an output of different power splitters to amplify signals provided to the electrical signal combiner.

12. The multi-frequency optical signal source of claim 1 wherein each of the electrical modulation signals is digital.

13. The multi-frequency optical signal source of claim 1 implemented using one or more integrated circuit chips.

14. Apparatus for controlling nonlinearities of a multi-frequency signal source integrated circuit, comprising:

means for obtaining a portion of each of an electrical input data signal used to modulate a different one of a plurality of input optical sources, connection means, each connected to a different input data signal, for providing a different predetermined signal delay for each input data signal, and combining means having a plurality of inputs, each input connected to receive one of the delayed input data signals, for combining a portion of the modulation signal received from the connected delay means to form a combined electrical signal at an output of the combining means, the output of the combining means being connected to control a biasing signal to the output amplifier of the multi-frequency signal source.

* * * * *